Aug. 4, 1931.  H. L. BOOTH  1,816,890
WEED CUTTER
Filed June 19, 1929

INVENTOR.
Herbert L Booth
BY
Robt. D. Pearson
ATTORNEY.

Patented Aug. 4, 1931

1,816,890

UNITED STATES PATENT OFFICE

HERBERT L. BOOTH, OF BEVERLY HILLS, CALIFORNIA

WEED CUTTER

Application filed June 19, 1929. Serial No. 372,176.

This invention relates to a weed cutter adapted to be used as an attachment to a lawn mower or, possibly, as an attachment to other wheeled implements, or suited, if desired, for being designed to be used independently of other implements.

An object of the invention is to provide a weed cutter of a simple, inexpensive type which will be an improvement upon others of its class with respect to greater efficiency of operation in proportion to the amount of power required for its propulsion.

Another object of the invention is to provide a weed cutter in which each cutting element, together with the part of which said element is attached, may be conveniently stamped out by a single operation of a die, thus providing a strong, simple construction at a low manufacturing cost.

Other objects and advantages may hereinafter appear.

Figure 1:
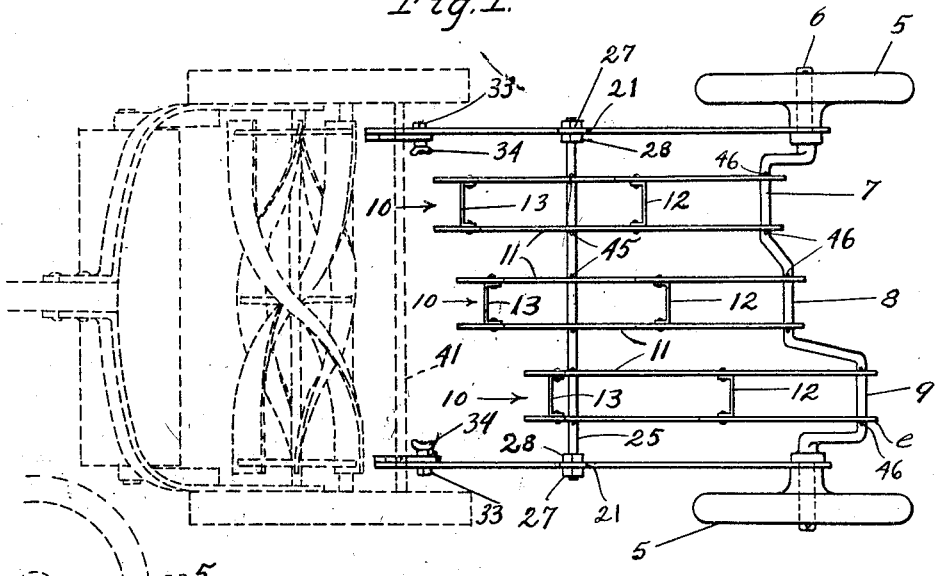

Referring to the accompanying drawings, which illustrate what is at present deemed to be a preferred embodiment of the invention, Fig. 1 is a plan view of the device.

Figure 2:
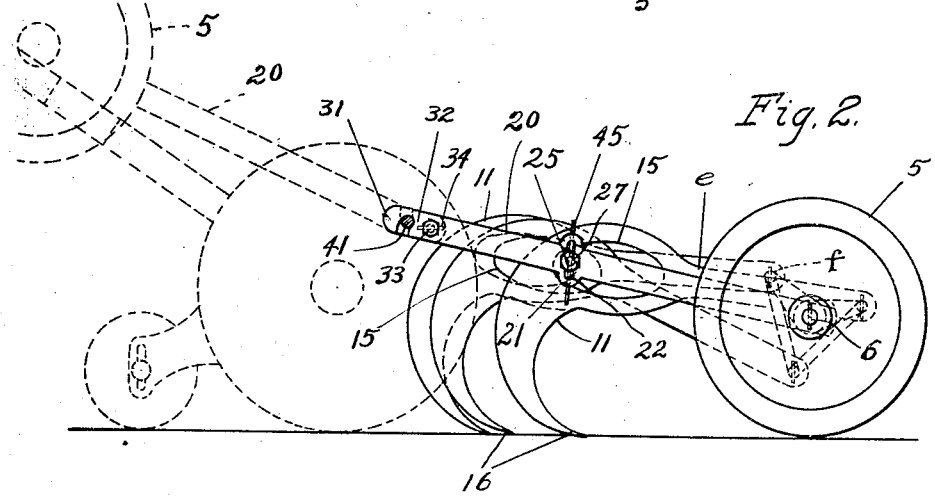

Fig. 2 is a side elevation of the device, the lawn mower to which it is attached being partly shown by dotted lines.

Referring in detail to the drawings, the ground wheels 5 support between them a combined axle and multiple crank shaft 6 which, in the present embodiment of the invention is provided with the three crank shaft portions 7, 8 and 9. Said crank shaft portions 7, 8 and 9 are each designed to trail behind them a weed cutting device 10 which in the present embodiment of the invention comprises two tooth plates 11 held in a vertical position and attached together in spaced relation to each other by a front spacer 12 and rear spacer 13.

Between said spacers 12 and 13 each of said plates is provided with a relatively large preferably elliptical opening 15, the length of said opening being at least twice the radius of the crank portion of the shaft 6 to which the front ends of said plates are loosely connected.

Each of said plates 11 is provided with a digging tooth 16. Said plates 11 together with their teeth 16 are preferably identical in construction and made of relatively thin plates of metal so that they may be completely stamped out by a die at a single operation.

Each of said plates 10 and 11 is provided at its front end with an extension e in the forward end of which is a hole f through which loosely extends the portion of the shaft 6 behind which said plate is trailed.

The appliance is desirably constructed to be pushed in front of a lawn mower, and when thus constructed is provided at each side with a push bar 20 having a vertically slotted downward extension part 21 at about its midlength. The slot 22 of said downward extension is designed to receive the end portions of a cross bar 25, each end of said bar being secured in a vertically adjusted position by means of the clamping nuts 27 and 28.

The rear end of each of said push bars is provided with a tooth 30 with which cooperates a tooth 31 of a gripping jaw 32 which is secured to the rear portion of said push bar 20 by means of a combined pivot and clamping bolt 33 which is provided with a thumb nut 34. The jaw construction which has just been described is designed for attachment to the bar 41 at each side of the lawn mower.

The cross bar 25 is provided with a series of properly spaced pins 45 which are arranged to guide the movements of the cutting devices 10. Said pins 45 are long enough to bridge at all times the elliptical openings 15 through the paired plates 11 of said cutting devices.

Keeper pins 46 are provided in crank shaft 6 to hold in place the portions of plates 11 pivoted to said shaft.

In operation, when the device is attached to a lawn mower, as indicated in the drawings, when the lawn mower is put into operation the device is pushed in advance thereof and the forward movement of the ground wheels 5 conveys the device forward as a whole and at the same time rotates the crank shaft 6 thus causing each weed cutting device 10 to advance forward at a varying speed. When the particular crank portion behind which one of said devices is being trailed is in the uppermost position the speed of the weed cutter trailed thereby will be greatest, and when such crank portion is in its lowest position the speed of such weed cutter will be the least, and will drop to almost nothing if the radius of the crank portions is nearly the same as the radius of the ground wheels. The various crank portions are arranged to cause the weeding implements trailed thereby to operate successively, and not simultaneously, at their highest speeds. This arrangement makes the traction of the implement less than it would be if all the weed cutting implements were trailed behind a straight axle and therefore at a uniform speed. The force required to urge them forward at the higher speeds provided is but slightly greater than the force which would be required to propel them at a slower speed.

The openings 15 through the traction plates or bars 10 and 11 are sufficiently long to permit the crank portions 28 and 29 to move said traction bars forward and rearward with respect to the ground wheels the length of the stroke of said crank portions. Said openings 15 are also of sufficient vertical dimensions to permit the digging teeth 16 to remain in contact with the soil at all times during the advance of the implement.

When it is desired to transport the implement in an inoperative position, the push bars 20 thereof are swung back upon the lawn mower in the position indicated by dotted lines.

Claims:

1. In a device of the character described, ground wheels, a shaft operatively connected with said ground wheels to be rotated thereby, said shaft having a plurality of crank portions, a plurality of vertically disposed plates connected with said crank portions to be trailed thereby, said plates having toothed portions adapted to engage the soil, propelling arms operatively connected with said ground wheels, and a cross-bar connecting said propelling arms, there being openings in said plates through which said cross-bar extends, said openings being of a sufficient size to permit said crank portions to reciprocate said plates, without withdrawing said toothed portions of said plate from the soil.

2. In a device of the character described, a soil-engaging implement comprising two toothed plates, means to secure said plates together in parallel spaced relation to each other, a vehicle frame, ground wheels to aid in supporting said frame, and means operatively connected with said ground wheels to trail said toothed plates over the ground at varying speeds, there being a cross bar which forms part of said frame, said plates having openings through which said cross-bar extends, said openings being of sufficient size to permit said plates to reciprocate as the speed at which they are trailed varies, said openings being of sufficient vertical extent to permit the teeth of said plates to remain in the soil while the implement advances.

3. In a device of the character described, ground wheels, a shaft operatively connected with said ground wheels to be rotated thereby, said shaft having a crank portion, a traction bar having its front end pivotally mounted upon said crank portion, a digging implement in fixed relation to the rear portion of said traction bar, a frame mounted upon said ground wheels and laterally enclosing said traction bars, said frame having a cross bar extending from side to side thereof, there being an opening in said traction bar through which said cross bar extends, said opening being of a sufficient size to permit said traction bar to maintain said digging implement at all times in contact with the soil.

4. In a device of the character described, a push frame having side bars and a cross bar which connects said cross bars intermediate their ends, a shaft extending from side to side of the front ends of said frame and rotatably mounted in said side bars, a traction bar having its front end in a pivotal engagement with the crank portion of said shaft, said traction bar having a digging implement secured to the rear portion thereof and having also an opening through which said cross bar extends, said opening being of sufficient size to permit said digging implement to remain at all times in contact with the soil.

5. In a device of the character described, a digging implement comprising a pair of elongated plates, means to secure said plates together in parallel spaced fixed relation to each other, one end of each of said plates being tapered and curved to form a digging tooth, and means to trail said pair of plates across the surface of the soil in position to perform their digging function.

6. In a device of the character described, a push frame comprising a push bar at each side thereof, a rod extending transversely of said frame and securing said push bars together intermediate their ends, means at one end of said pair of push bars adapted to detachably secure them to the frame of a lawn mower, a shaft carried by and extending across the other end of said pair of push rods, ground wheels mounted on said shaft, said shaft having crank portions, a plurality of traction bars having their front ends pivotally mounted upon said crank portions to be thereby trailed at various speeds as the vehicle advances, and digging implements carried by the rear portions of said traction bars, said traction bars having openings through which the aforementioned cross bar extends, said openings being of sufficient size to permit said digging implements to remain uniformly imbedded in the soil as the vehicle advances.

In testimony whereof I hereby affix my signature.

HERBERT L. BOOTH.